(12) United States Patent
Cherepinsky et al.

(10) Patent No.: US 9,908,614 B2
(45) Date of Patent: Mar. 6, 2018

(54) CREW SEAT INTEGRAL INCEPTOR SYSTEM FOR AIRCRAFT

(71) Applicant: Sikorsky Aircraft Corporation, Stratford, CT (US)

(72) Inventors: Igor Cherepinsky, Sandy Hook, CT (US); Harshad S. Sane, Southbury, CT (US)

(73) Assignee: SIKORSKY AIRCRAFT CORPORATION, Stratford, CT (US)

(*) Notice: Subject to any disclaimer, the term of this patent is extended or adjusted under 35 U.S.C. 154(b) by 0 days.

(21) Appl. No.: 14/701,032

(22) Filed: Apr. 30, 2015

(65) Prior Publication Data

US 2015/0314857 A1 Nov. 5, 2015

Related U.S. Application Data

(60) Provisional application No. 61/987,836, filed on May 2, 2014.

(51) Int. Cl.
*B64C 13/04* (2006.01)
*B64C 13/50* (2006.01)
*B64C 27/56* (2006.01)
*B64D 11/06* (2006.01)

(52) U.S. Cl.
CPC ............ *B64C 13/04* (2013.01); *B64C 13/503* (2013.01); *B64C 27/56* (2013.01); *B64D 11/0689* (2013.01)

(58) Field of Classification Search
CPC ....... B64C 13/04; B64C 13/50; B64C 13/503; B64C 27/56; B60R 1/064; G05G 7/02
USPC .................... 244/223, 184; 74/491, 492
See application file for complete search history.

(56) References Cited

U.S. PATENT DOCUMENTS

| 2,787,746 A | * | 4/1957 | Redmond | B64C 13/04 244/236 |
| 3,580,636 A | * | 5/1971 | Setto | B64D 11/06 244/234 |
| 3,911,436 A | * | 10/1975 | Schanzer | G05D 1/0676 244/184 |
| 4,688,443 A | * | 8/1987 | Fabre | B64C 13/12 318/564 |
| 4,716,399 A | * | 12/1987 | Nordlund | B64C 13/12 250/221 |

(Continued)

FOREIGN PATENT DOCUMENTS

| CN | 202257277 U | 5/2012 |
| WO | 9905580 A2 | 2/1999 |

*Primary Examiner* — Assres H Woldemaryam
(74) *Attorney, Agent, or Firm* — Cantor Colburn LLP

(57) ABSTRACT

A system and method for controlling a trajectory of a vehicle includes a crew seat with first and second inceptors mounted to a portion of the crew seat; a processor with memory having instructions stored thereon that cause the system to: receive signals indicative of a trajectory for the vehicle; receive signals indicative of a deviation in a trajectory of the vehicle; and transmit signals for controlling a flight path of the vehicle. A second inceptor is configured for selecting one or more menus on a user display and being configured to interact with a fly-by-wire control system for transmitting signals indicative of movement of flight surface of the vehicle. The crew seat is configured to be located on the vehicle, in a control station remotely located from the vehicle, or in a second vehicle remotely located from the vehicle.

14 Claims, 4 Drawing Sheets

(56) References Cited

U.S. PATENT DOCUMENTS

| | | | |
|---|---|---|---|
| 4,738,417 A * | 4/1988 | Wenger | B62D 1/12 244/234 |
| 4,865,277 A * | 9/1989 | Smith | B64C 13/12 244/229 |
| 5,002,241 A * | 3/1991 | Tizac | B64C 13/04 244/223 |
| 5,406,076 A * | 4/1995 | Mimura | G01D 5/36 250/229 |
| 5,938,282 A * | 8/1999 | Epple | B60N 2/4693 180/315 |
| 5,945,646 A * | 8/1999 | Miller | B60K 35/00 200/1 R |
| 6,347,770 B1 * | 2/2002 | Oyzerskiy | B64C 13/12 244/221 |
| 6,644,141 B2 * | 11/2003 | Oikarinen | G05G 9/047 188/333 |
| 7,292,224 B2 * | 11/2007 | McAuliffe | G06F 3/0346 345/161 |
| 7,302,322 B1 * | 11/2007 | Szczerba | B60R 16/0231 701/29.6 |
| 7,334,658 B2 * | 2/2008 | Berg | B62D 1/12 180/333 |
| 7,497,298 B2 * | 3/2009 | Shearer | E02F 3/7663 180/333 |
| D593,465 S * | 6/2009 | Delage | D12/179 |
| 7,885,732 B2 | 2/2011 | Troy et al. | |
| 8,002,220 B2 * | 8/2011 | Wilkens | B64C 13/10 244/223 |
| 8,102,384 B2 * | 1/2012 | Yamada | B60K 37/06 345/156 |
| 8,469,317 B2 * | 6/2013 | Burroughs | B64C 13/12 244/224 |
| D704,189 S * | 5/2014 | Rey | D14/412 |
| D736,719 S * | 8/2015 | Burt | D13/168 |
| 2003/0037985 A1 * | 2/2003 | Jeppe | G05G 1/58 180/333 |
| 2004/0046751 A1 * | 3/2004 | Heimermann | B60K 35/00 345/184 |
| 2005/0034549 A1 * | 2/2005 | Braud | B66F 9/20 74/473.1 |
| 2008/0190233 A1 * | 8/2008 | Peterson | G05G 9/047 74/471 XY |
| 2010/0071496 A1 * | 3/2010 | Hanlon | G05G 5/05 74/471 XY |
| 2010/0077885 A1 * | 4/2010 | Karvonen | G06F 3/03549 74/491 |
| 2012/0004791 A1 | 1/2012 | Buelthoff et al. | |
| 2012/0072056 A1 * | 3/2012 | Hasan | B64C 13/00 701/3 |
| 2012/0085870 A1 * | 4/2012 | Coote | B60N 2/4693 244/234 |
| 2013/0138274 A1 * | 5/2013 | Caldeira | G05D 1/0676 701/16 |
| 2014/0138492 A1 * | 5/2014 | Van Staagen | B64C 13/04 244/228 |

* cited by examiner

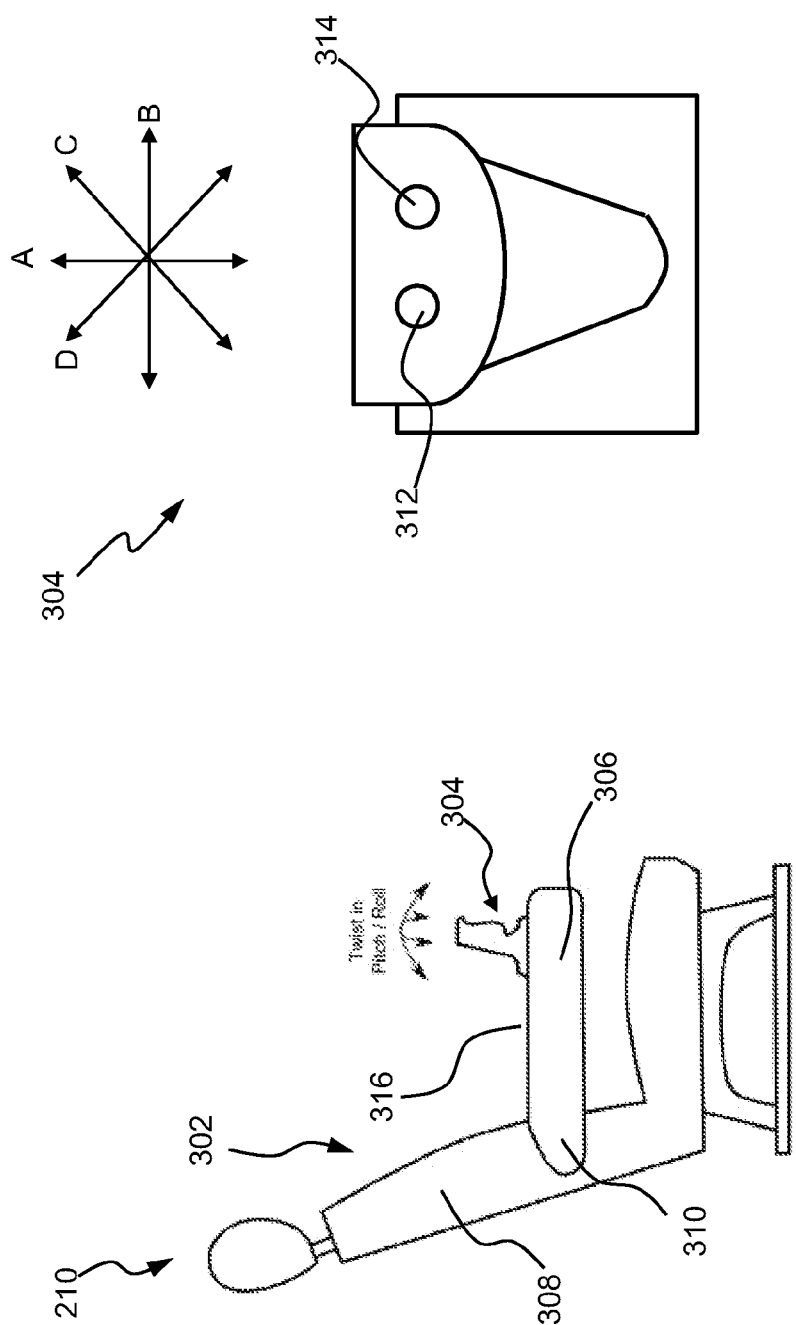

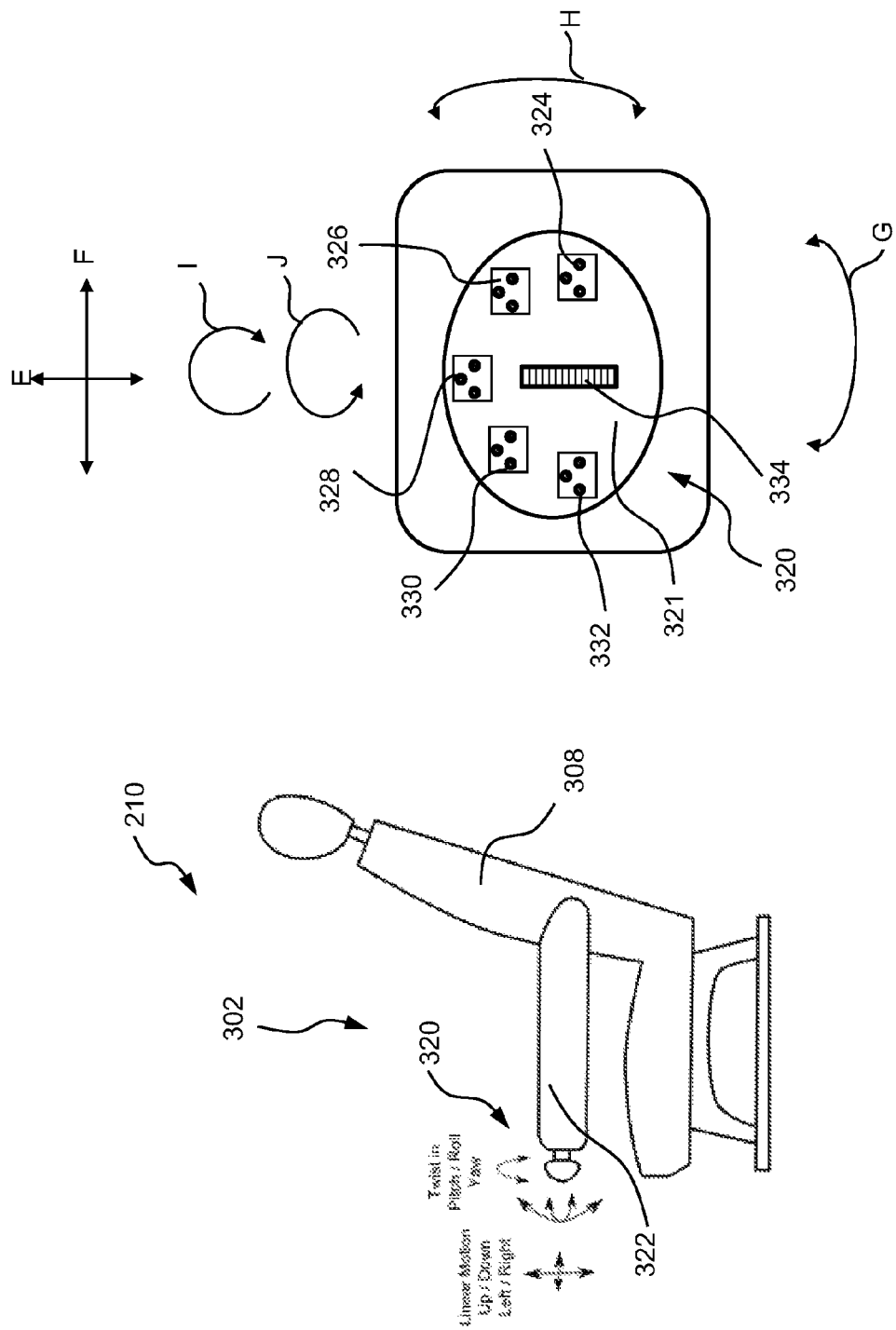

CREW SEAT INTEGRAL INCEPTOR SYSTEM FOR AIRCRAFT

CROSS-REFERENCE TO RELATED APPLICATIONS

This application claims the benefit of U.S. provisional patent application Ser. No. 61/987,836, filed May 2, 2014, the entire contents of which are incorporated herein by reference.

BACKGROUND

The subject matter disclosed herein relates generally to the field of vehicle controls and to a crew seat with an integral inceptor system for controlling a trajectory of an aircraft.

DESCRIPTION OF RELATED ART

When in flight, an aircraft may be oriented about a plurality of axes. The aircraft's orientation may also be referred to as aircraft state. In both fixed wing and rotary wing aircrafts, it is common for the pilot to use a variety of positionable controls including sticks, levers, collective, and rudder pedals to control aircraft state including attitude, altitude, speed, and the like. Commonly referred to as "sticks", these inceptors can be used to adjust control surfaces of the aircraft. As highly augmented optionally piloted aircraft emerge, a new way to interact with these aircraft is needed to perform mission goals. Existing fly-by-wire systems that use traditional control sticks, collective sticks, and rudder pedals are no longer sufficient to perform mission goals and control aircraft trajectory. An integral crew seat inceptor system for controlling aircraft trajectory would be well received in the art.

BRIEF SUMMARY

According to an aspect of the invention, a system for controlling a trajectory of a vehicle includes a crew seat with an inceptor mounted to a portion of the crew seat, the inceptor being movable about at least a first axis; a processor with memory having instructions stored thereon that, when executed by the processor, cause the system to: receive signals indicative of a trajectory for the vehicle; receive signals indicative of a deviation in a trajectory of the vehicle; and transmit signals for controlling a flight path of the vehicle in response to the receiving of the deviation signals.

In addition to one or more of the features described above, or as an alternative, further embodiments could include an inceptor with a spherical body having a plurality of controls that are configured for inputting the deviation signals for the vehicle.

In addition to one or more of the features described above, or as an alternative, further embodiments could include an inceptor that is configured to rotate along a rotational axis, translate along a linear axis, or a combination of rotation and translation.

In addition to one or more of the features described above, or as an alternative, further embodiments could include an inceptor that emanates from a front end of a seat arm of the crew seat, the inceptor being configured to be held in a hand of an operator hand as a forearm of the operator rests on the seat arm.

In addition to one or more of the features described above, or as an alternative, further embodiments could include an inceptor with a tracking ball configured for determining a time period for controlling the flight path of the vehicle.

In addition to one or more of the features described above, or as an alternative, further embodiments could include a crew seat that is configured to be located on the vehicle, in a control station remotely located from the vehicle, or in a second vehicle remotely located from the vehicle.

In addition to one or more of the features described above, or as an alternative, further embodiments could include a second inceptor that is configured for selecting one or more menus on a user display.

In addition to one or more of the features described above, or as an alternative, further embodiments could include a second inceptor that is configured to interact with a fly-by-wire control system for transmitting signals indicative of movement of flight surface of the vehicle.

In addition to one or more of the features described above, or as an alternative, further embodiments could include an inceptor that includes a thumb wheel configured to navigate through menus that are displayed on a graphical user interface.

According to another aspect of the invention, a method for controlling a trajectory of a vehicle includes receiving, with a processor, signals indicative of a trajectory for the vehicle; and receiving, with the processor, signals indicative of a deviation in a trajectory of the vehicle; and transmitting, with the processor, signals for controlling a flight path of the vehicle in response to the receiving of the deviation signals.

In addition to one or more of the features described above, or as an alternative, further embodiments could include receiving the deviation signals from an inceptor integrated into a crew seat, the inceptor comprising a spherical body with a plurality of controls that is configured for inputting the trajectory for the vehicle.

In addition to one or more of the features described above, or as an alternative, further embodiments could include determining a time period for controlling the flight path of the vehicle with a tracking ball.

In addition to one or more of the features described above, or as an alternative, further embodiments could include locating the crew seat on the vehicle, in a control station remotely located from the vehicle, or in a second vehicle remotely located from the vehicle.

In addition to one or more of the features described above, or as an alternative, further embodiments could include selecting one or more menus on a user display with a second inceptor.

In addition to one or more of the features described above, or as an alternative, further embodiments could include a second inceptor that is configured for interacting with a fly-by-wire control system for transmitting signals indicative of movement of flight surface of the vehicle.

Technical effects of the invention include controlling a trajectory of a vehicle in an optionally piloted vehicle and, specifically, by removing a human pilot from a vehicle control loop and allowing a pilot to become a mission operator through manipulation of control inceptors integrated with a crew seat. The invention may be implemented in an aircraft whose trajectory is being controlled, in a ground control station to control a trajectory of an aircraft in flight, or in a second aircraft that is controlling a trajectory of a first aircraft.

Other aspects, features, and techniques of the invention will become more apparent from the following description taken in conjunction with the drawings.

BRIEF DESCRIPTION OF THE SEVERAL VIEWS OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which like elements are numbered alike in the several FIGURES:

FIG. 3A is a right side view of a crew seat having an integral inceptor system according to an embodiment of the invention;

FIG. 3B is a perspective view of a detail of an inceptor of FIG. 3A according to an embodiment of the invention;

FIG. 3C is a left side view of a crew seat having an integral inceptor system according to an embodiment of the invention; and FIG. 3D is a front view of a detail of an inceptor of FIG. 3C according to an embodiment of the invention.

DETAILED DESCRIPTION

Figure 1:
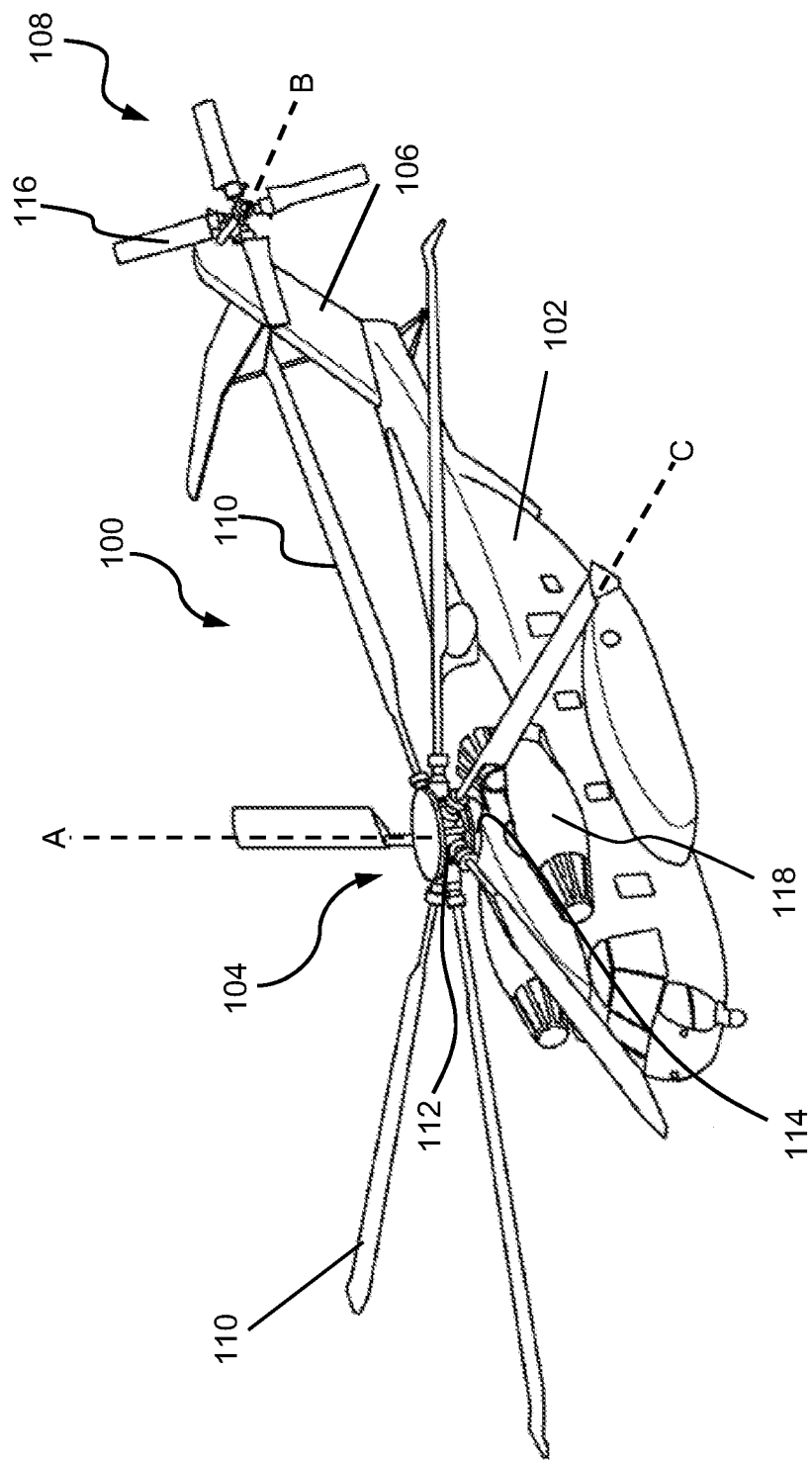
FIG. 1 is a schematic view of an example vehicle according to an embodiment of the invention.

Referring now to the drawings, FIG. 1 illustrates a general perspective view of an exemplary vehicle in the form of a vertical takeoff and landing (VTOL) rotary-wing aircraft 100 for use with a crew seat integral inceptor system 210 (FIG. 2) according to an embodiment of the invention. In an embodiment, aircraft 100 is an optionally piloted vehicle and can autonomously determine aircraft states as it traverses a flight plan. A crew seat integral inceptor system 210 (hereinafter "integral inceptor system 210") can be used to adjust the trajectory or flight path of aircraft 100 in real-time through one or more controls integrated into a crew seat. Aircraft 100 includes an airframe 102 having a main rotor 104 and an extending tail 106 which mounts an anti-torque system, such as a tail rotor 108. In embodiments, the anti-torque system may include a translational thrust system, a pusher propeller, a rotor propulsion system, or similar. The main rotor 104 includes a plurality of rotor blades 110 mounted to a rotor hub 112 that rotates about rotor axis A, while tail rotor 108 includes a plurality of rotor blades 116 that rotates about axis B. Main rotor 104 is connected to a conventional swashplate 114 which is driven by one or more control servos to move and/or tilt the swashplate 114 with respect to the rotor axis A. For example, the swashplate 114 may be commanded to move along rotor axis A so as to cause the blades 110 to vary pitch collectively relative to a blade axis C. Also, tilting of the swashplate 114 either longitudinally or laterally relative to the axis A will cause the blades 110 to pitch cyclically in respective longitudinal or lateral directions relative to the blade axis C. Main rotor 104 and tail rotor 108 are driven to rotate by one or more engines 118 through one or more gearboxes (not shown). Although a particular helicopter is illustrated and described in the disclosed embodiment, it will be appreciated that other configurations and/or machines include autonomous and optionally piloted aircraft that may operate in land or water including fixed-wing aircraft, rotary-wing aircraft, and land vehicles (e.g., trucks, cars, etc.) may also benefit from embodiments disclosed.

Figure 2:
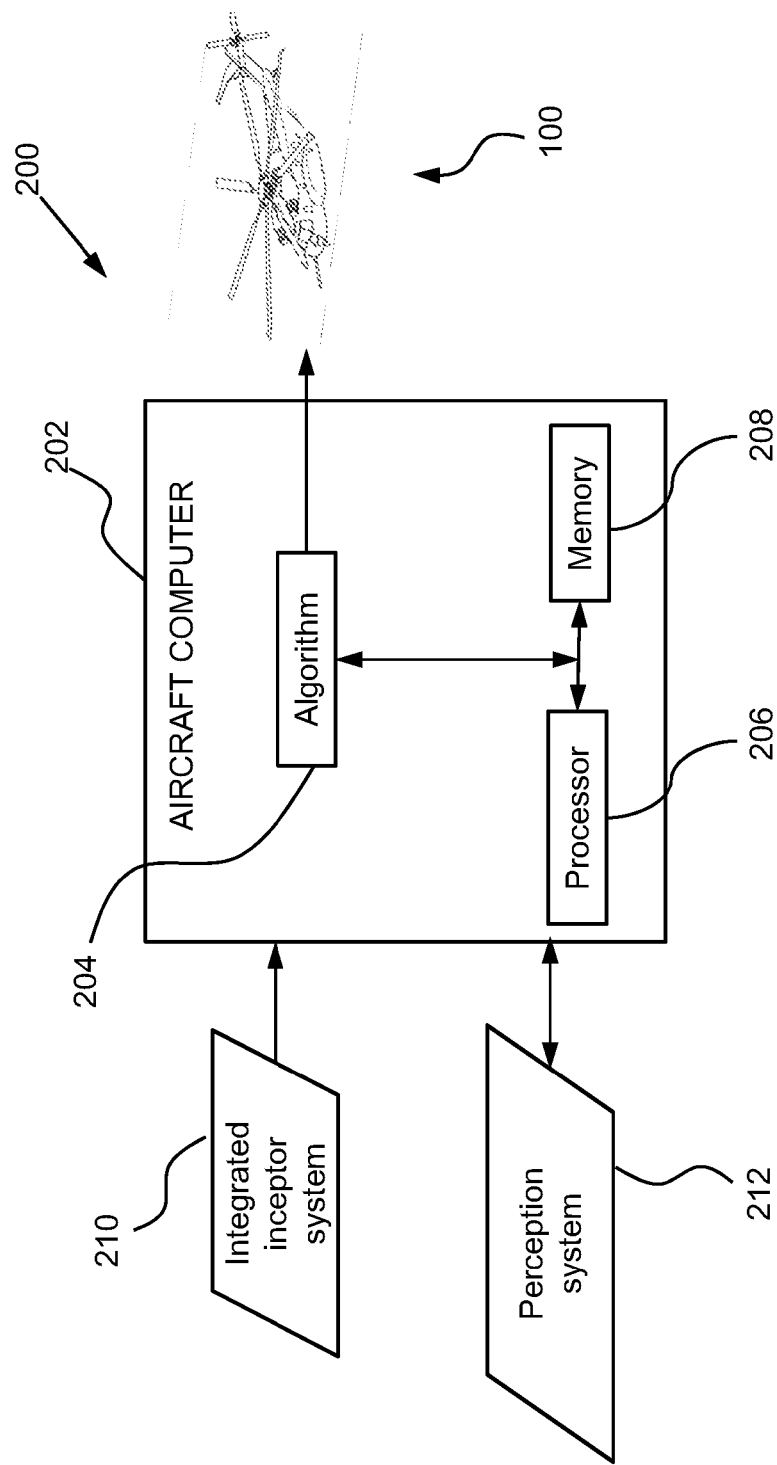
FIG. 2 is a schematic view of an example computing system according to an embodiment of the invention.

FIG. 2 illustrates a schematic block diagram of a control system 200 (for aircraft 100) according to an exemplary embodiment. As illustrated, control system 200 executes one or more algorithms 204 for adjusting a trajectory for aircraft 100. Control system 200 includes a computing system such as an aircraft computer 202 having one or more processors and memory to implement a trajectory for aircraft 100 in support of a flight plan and mission goals. A flight plan, which supports the mission goals, has a plurality of waypoints and includes a trajectory between the plurality of waypoints. The trajectory may be determined during flight or be pre-loaded on aircraft 100. The computer 202 is configured to process data received from a crew seat integral inceptor system 210 in order to adjust the trajectory for aircraft 100 for a present aircraft location or at an aircraft location at a future time. Aircraft computer 202 includes a memory 208. Memory 208 stores algorithm 204 as executable instructions that is executed by processor 206. The instructions may be stored or organized in any manner and at any level of abstraction, such as in connection with the execution of algorithm 204. Processor 206 may be any type of processor (CPU), including a general purpose processor, a digital signal processor, a microcontroller, an application specific integrated circuit, a field programmable gate array, or the like. Also, in embodiments, memory 208 may include random access memory (RAM), read only memory (ROM), or other electronic, optical, magnetic, or any other computer readable medium onto which is stored algorithm 204.

Aircraft 100 includes a perception system 212 having sensors associated with one or more acquisition devices for capturing state information or positional information for aircraft 100. In embodiments, perception system 212 can be a navigation system such as, for example, a Global Positioning System (GPS) or an Inertial Measurement unit (IMU) that can be used to acquire positional data and trajectory information related to a current location and acceleration of aircraft 100 and can be used to determine a geographic location of aircraft 100 including a change from the initial position of aircraft 100, sensors associated with a vision system such as cameras, LIght Detection and Ranging scanner (LIDAR), LAser Detection and Ranging scanner (LADAR), and radio communications such as air data scanner, instrument landing system (ILS) and radio navigation, or the like.

FIGS. 3A-3D illustrate views of a crew seat integral inceptor system 210 according to an embodiment of the invention. In embodiments, integral inceptor system 210 is used to control a trajectory of an aircraft and can be located within the aircraft whose trajectory is being controlled, either in the cockpit or cabin; can be located in a ground control station to control a trajectory of an aircraft in flight; or can be located in an aircraft in flight to control a trajectory of another independent aircraft also in flight such as, for example, between aircraft in a coordinated mission. In addition to the embodiments above, or as an alternative, further embodiment could include controlling trajectories for piloted vehicles or optionally piloted vehicles.

As illustrated in FIGS. 3A-3B, integral inceptor system 210 includes a crew seat 302 with an integrated inceptor 304 for controlling aircraft trajectory. Inceptor 302 is configured to be mounted to be accessible from a top surface 316 of a right seat arm 306 of crew seat 302. Seat arm 306 is configured to support a person's forearm when operating inceptor 304, and in particular when grasping inceptor 304. Additionally, seat arm 306 can be pivoted relative to seat back 308 about a pivot point 310 in order for an operator to ingress or egress crew seat 302. In an embodiment, inceptor 304 is in the form of an elongated "T-shaped" controller (e.g., a conventional joystick and is contoured to fit in an operator's hand when grasping inceptor 304. Inceptor 304 can also include a plurality of buttons 312, 314. Buttons 312, 314 are configured to provide feedback or acknowledgement to control system 200 when depressed by an operator. Also, inceptor 304 can move in multiple axes or degrees of movement in response to an input force applied from an operator of inceptor 304. Particularly, inceptor 304 can move vertically along direction of axis A, laterally along direction of axis B, as well as along directional axes C and D. Inceptor 302 may be implemented as an active inceptor or as a passive inceptor. In embodiment where the inceptor is active, inceptor 304 provides dynamic feedback to operator through tactile information. This tactile information includes at least one feedback component such as a servo or actuator positioned within seat arm 306.

In operation, moving inceptor 304 along axes of movement A-D by an operator of integral inceptor system 210 translates to moving a cursor on a graphical user interface (not shown) such as, for example, a user display for selection of menus. Additionally, an operator can select commands and/or menus that are displayed on user display. Selectively depressing buttons 312, 314 translates to selecting menu items on the user display. In addition to the features described above, inceptor 304 can be used to maneuver aircraft 100 in an emergency. Particularly, during an emergency where a failure in the aircraft 100 prevents it from flying autonomously, operator of integral inceptor system 210 can use inceptor 304 to interface with a conventional fly-by-wire system on aircraft 100 to transmit inputs to the flight control computer. These inputs are translated instantaneously into, e.g., pitch, roll, and yaw commands that adjust directional surfaces and power on the aircraft 100 in order to maneuver the aircraft 100 during flight and/or to a safe landing.

In addition to the features described above, another embodiment of integral inceptor system 210, illustrated in FIGS. 3C-3D, includes a crew seat 302 with an integrated inceptor 320 that emanates from a front end of seat arm 322. Seat arm 322 is configured to support a person's forearm when operating inceptor 322, and in particular when grasping inceptor 320. Additionally, seat arm 322 can be pivoted relative to seat back 308 about a pivot point 324 (i.e., pivot point 324 is a centerpoint of a circle for a radius of length of seat arm 322) in order for an operator to ingress or egress crew seat 302. In an embodiment, inceptor 320 has a generally spherical body 321 (e.g., shape of a conventional computer mouse) and is contoured to fit in an operator's hand when grasping inceptor body 321. Inceptor 320 can include a set of five controls 324-332 positioned on a face of body 321, with each control 324-332 having a group of buttons that can be selectively depressed by a user's finger immediately adjacent the control. As shown in FIG. 3D, each control 324-332 includes a group of three buttons that can be selectively depressed by a user's finger from a graphical user interface. Body 321 can be selectively movable along several degrees of freedom, i.e., vertically, horizontally, or rotationally, in response to an input force applied from an operator. Particularly, body 321 can be selectively movable vertically along direction of axis E, laterally along direction of axis F, clockwise rotation along arcuate direction J, counter-clockwise rotation along arcuate direction J, and rotationally along directions of arcuate axes G and H. Inceptor 302 may be implemented as an active inceptor or as a passive inceptor. In embodiment where the inceptor is active, inceptor 320 can provide dynamic feedback to operator through tactile information. This tactile information includes at least one feedback component such as a servo or actuator positioned within left seat arm 322. Information received from inceptor 302 may be transmitted to control system 200 for implementation on aircraft 100.

In an embodiment, inceptor 320 can optionally include a generally cylindrical thumb wheel 334 positioned at a generally central location of body 321. Thumb wheel 334 can be configured to be rotated along longitudinal axis E in order to select a trajectory at a particular time period. A user can selectively determine when to apply a selected trajectory that is displayed on a graphical user interface by moving thumb wheel 334 to navigate menus. Moving thumbwheel 334 can implement the trajectory at a present location of aircraft 100 or can implement the trajectory at a future time, or when aircraft is at a waypoint in the future.

In operation, moving body 321 of inceptor 320, along vertical and horizontal directions E and F or movement along arcuate directions G, H, I, or J, by an operator of integral inceptor system 210 translates to selecting a trajectory, which can be displayed on a graphical user interface for aircraft 100. Additional functionality for integral inceptor system 210 can be implemented through controls 324-332 for adjusting the trajectory of aircraft 100.

The terminology used herein is for the purpose of describing particular embodiments only and is not intended to be limiting of the invention. While the description of the present invention has been presented for purposes of illustration and description, it is not intended to be exhaustive or limited to the invention in the form disclosed. Many modifications, variations, alterations, substitutions or equivalent arrangement not hereto described will be apparent to those of ordinary skill in the art without departing from the scope and spirit of the invention. Additionally, while the various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A system for controlling a trajectory of a vehicle, comprising:
    a crew seat with a seat arm;
    an inceptor mounted to a portion of the seat arm, the inceptor including a spherical body having vertical, horizontal and three rotational degrees of freedom for selecting a trajectory of the vehicle, the spherical body including a plurality of controls for inputting the selected trajectory to the vehicle;
    a processor with memory having instructions stored thereon that, when executed by the processor, cause the system to:
    select a trajectory for the vehicle in response to a motion of the inceptor along at least one of the horizontal, vertical and rotational degrees of freedom; and
    transmit to the vehicle signals for controlling the trajectory of the vehicle in response to the selecting the trajectory.

2. The system of claim 1, wherein the spherical body of the inceptor is configured to be held in an operator's hand as a forearm of the operator rests on the seat arm.

3. The system of claim 1, wherein the spherical body of the inceptor includes a thumb wheel for selecting a time at which a flight path trajectory selected by the inceptor is applied to the vehicle.

4. The system of claim 1, wherein the crew seat is configured to be located on the vehicle, in a control station remotely located from the vehicle, or in a second vehicle remotely located from the vehicle.

5. The system of claim 1, further comprising another inceptor that is configured for selecting one or more menus on a user display.

6. The system of claim 5, wherein the other inceptor is configured to interact with a fly-by-wire control system for transmitting signals indicative of movement of flight surface of the vehicle.

7. The system of claim 1, wherein the inceptor includes a thumb wheel configured to navigate through menus that are displayed on a graphical user interface.

8. A method for controlling a trajectory of a vehicle, comprising:

receiving, with a processor, signals indicative of the trajectory for the vehicle;

receiving, with the processor, signals indicative of a deviation in the trajectory of the vehicle from an inceptor mounted on an arm of a crew seat of the vehicle, the inceptor including a spherical body having vertical, horizontal and three rotational degrees of freedom for selecting a trajectory of the vehicle, wherein motion of the spherical body along at least one of the horizontal, vertical and rotational degrees of freedom selects the trajectory, the spherical body including a plurality of controls for inputting the signals; and transmitting, with the processor, signals for controlling the trajectory of the vehicle in response to the receiving of the deviation signals.

9. The method of claim 8, further comprising rotating a thumb wheel of the spherical body of the inceptor to select a time at which a flight path trajectory selected by the inceptor is applied to the vehicle.

10. The method of claim 8, further comprising locating the crew seat on the vehicle, in a control station remotely located from the vehicle, or in a second vehicle remotely located from the vehicle.

11. The method of claim 8, further comprising selecting one or more menus on a user display via another inceptor.

12. The method of claim 11, wherein the other inceptor is configured for interacting with a fly-by-wire control system for transmitting signals indicative of movement of flight surface of the vehicle.

13. The system of claim 1, further comprising displaying a flight path trajectory selected by the inceptor at a graphical user interface.

14. The system of claim 3, wherein the time at which a flight path trajectory is applied to the vehicle further comprises a waypoint of the vehicle.

* * * * *